US011463775B2

(12) United States Patent
Hwang et al.

(10) Patent No.: US 11,463,775 B2
(45) Date of Patent: Oct. 4, 2022

(54) IMAGE DISPLAY DEVICE AND METHOD FOR OPERATING SAME

(71) Applicant: SAMSUNG ELECTRONICS CO., LTD., Suwon-si (KR)

(72) Inventors: Junho Hwang, Suwon-si (KR); Hoseock Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/284,503

(22) PCT Filed: Jul. 15, 2019

(86) PCT No.: PCT/KR2019/008709
§ 371 (c)(1),
(2) Date: Apr. 12, 2021

(87) PCT Pub. No.: WO2020/101140
PCT Pub. Date: May 22, 2020

(65) Prior Publication Data
US 2021/0377617 A1 Dec. 2, 2021

(30) Foreign Application Priority Data
Nov. 16, 2018 (KR) .................. 10-2018-0141952

(51) Int. Cl.
H04N 21/258 (2011.01)
H04N 21/418 (2011.01)
(Continued)

(52) U.S. Cl.
CPC . H04N 21/47211 (2013.01); H04N 21/25875 (2013.01); H04N 21/4126 (2013.01); H04N 21/4415 (2013.01); H04N 21/4753 (2013.01)

(58) Field of Classification Search
None
See application file for complete search history.

(56) References Cited

U.S. PATENT DOCUMENTS 8,413,232 B2    4/2013  Bae et al.
2011/0138459 A1* 6/2011  Bae ................ G06F 21/6209
                                                      726/19
(Continued)

FOREIGN PATENT DOCUMENTS

KR    1020090011298 A    2/2009
KR    1020110064532 A    6/2011
(Continued)

OTHER PUBLICATIONS

International Search Report (PCT/ISA/210) and Written Opinion (PCT/ISA/237) dated Oct. 25, 2019 issued by the International Searching Authority in International Application No. PCT/KR2019/008709.

Primary Examiner — Brian T Pendleton
Assistant Examiner — Jean D Saint Cyr
(74) Attorney, Agent, or Firm — Sughrue Mion, PLLC

(57) ABSTRACT

Provided is an image display device including: a communication unit configured to receive, from a control device, a control command for controlling an operation of the image display device; a memory storing one or more instructions; and a processor configured to execute the one or more instructions stored in the memory, wherein the processor is configured to execute the one or more instructions to: receive first user information about a first user corresponding to a user of the control device and authentication state information representing a user authentication state in the control device; when the control command includes an operation request that requires authentication, perform the authentication based on the first user information, the authentication state information, and second user information about a second user corresponding to a user of the image display device; and perform the operation in response to the control command.

12 Claims, 15 Drawing Sheets

(51) Int. Cl.
*H04N 21/422* (2011.01)
*H04N 21/472* (2011.01)
*H04N 21/41* (2011.01)
*H04N 21/4415* (2011.01)
*H04N 21/475* (2011.01)

(56) References Cited

U.S. PATENT DOCUMENTS

| | | | | |
|---|---|---|---|---|
| 2012/0206236 | A1* | 8/2012 | King | G06F 21/32 |
| | | | | 340/5.82 |
| 2015/0156529 | A1* | 6/2015 | Peterson | H04N 21/6582 |
| | | | | 725/12 |
| 2017/0055146 | A1 | 2/2017 | Ko | |

FOREIGN PATENT DOCUMENTS

| | | |
|---|---|---|
| KR | 1020120082223 A | 7/2012 |
| KR | 1020130078848 A | 7/2013 |
| KR | 1020170004104 A | 1/2017 |
| KR | 101835718 B1 | 3/2018 |
| KR | 101853270 B1 | 5/2018 |

* cited by examiner

FIG. 1
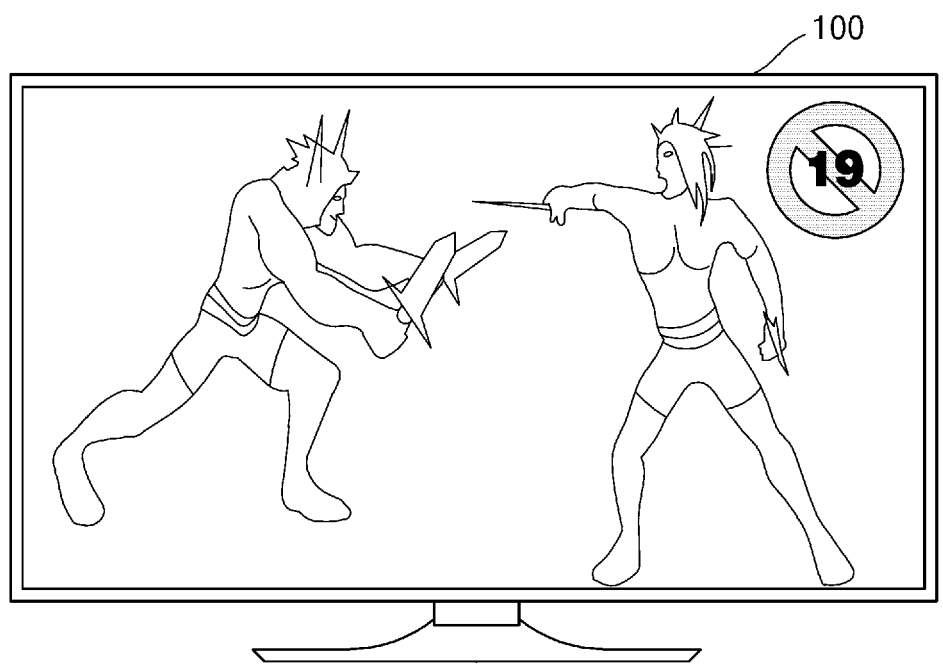
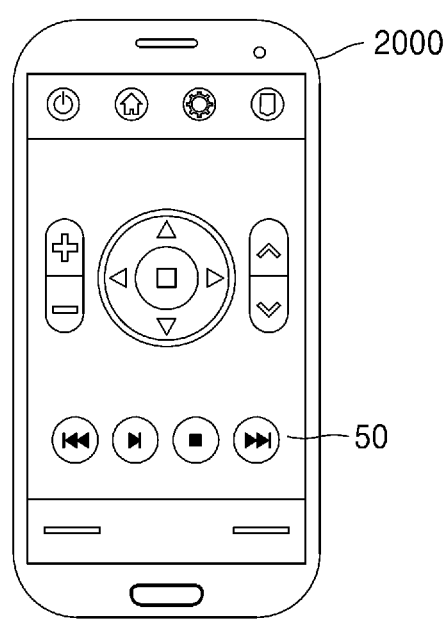

FIG. 7A
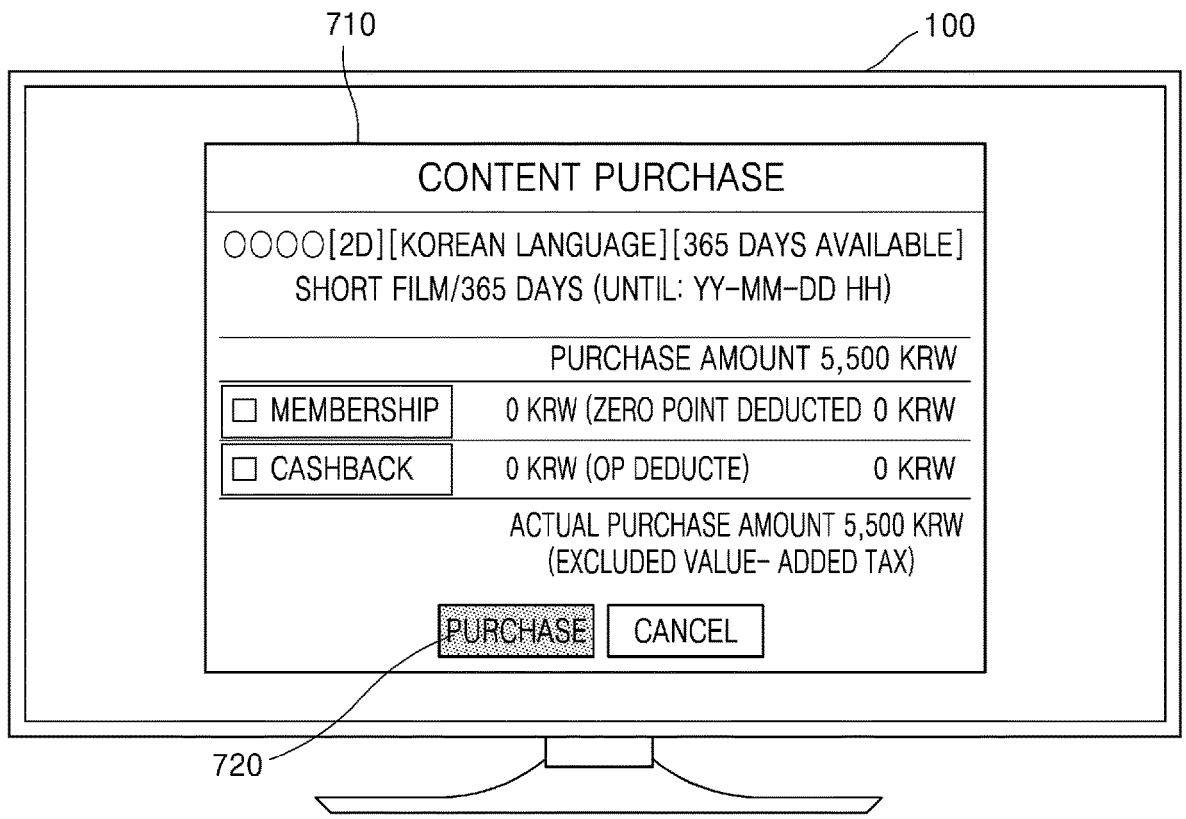
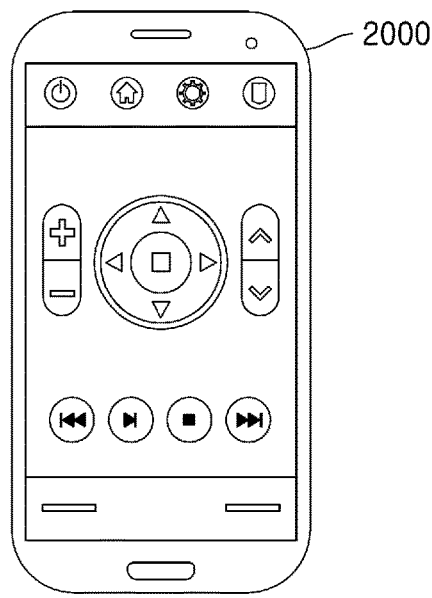

FIG. 8A
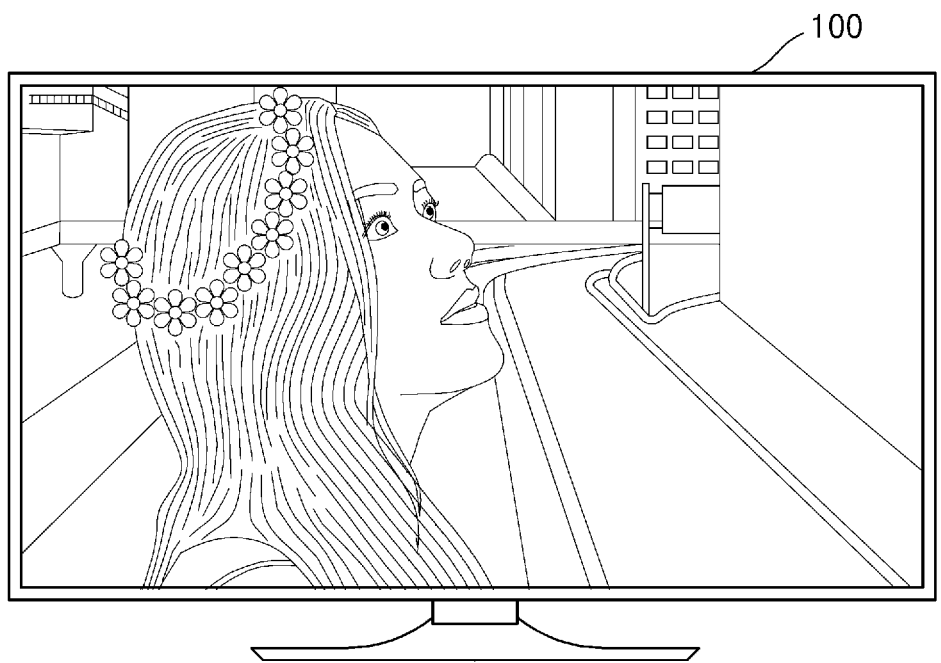
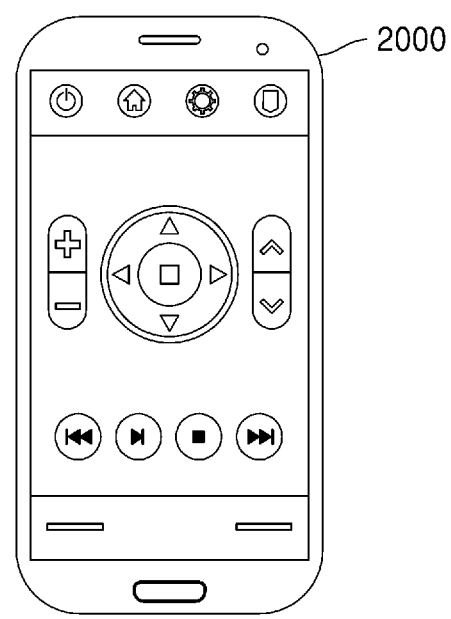

IMAGE DISPLAY DEVICE AND METHOD FOR OPERATING SAME

TECHNICAL FIELD

Various embodiments relate to an image display device and a method of operating the image display device, and more particularly, to an image display device capable of performing user authentication by using a control device and a method of operating the image display device.

BACKGROUND ART

An image display device is a device that has a function of displaying an image that a user may watch. The user may watch broadcast via the image display device. The image display device may display broadcast, which is selected by the user, among broadcast signals transmitted from a broadcasting station.

Also, a smart television (TV) for providing various content in addition to a broadcasting function has been provided. The smart TV does not operate passively in response to user selection, but aims to analyze and provide what the user wants without being manipulated by the user.

When performing an operation that requires user authentication, the image display device receives an input of a password or a PIN number and performs authentication. In this case, security is vulnerable. Alternatively, the image display device may perform biometric authentication by using an external device capable of biometric authentication to strengthen security, but, in this case, a user scenario moves to the external device, resulting in complexity and poor usability.

DESCRIPTION OF EMBODIMENTS

Solution to Problem

Various embodiments may provide an image display device capable of performing authentication while strengthening security and not impairing usability, and a method of operating the image display device.

Advantageous Effects of Disclosure

An image display device according to an embodiment may strengthen security of an authentication means by performing authentication by using a control device capable of biometric authentication.

According to an embodiment, the image display device does not require an additional authentication procedure for a user, and thus, usability may not deteriorate and use convenience of the user may be improved.

BRIEF DESCRIPTION OF DRAWINGS

FIG. 1 is a diagram of an image display device and a control device, according to an embodiment.

FIGS. 7A to 7C are reference diagrams for explaining an operation of an image display device, according to an embodiment.

FIGS. 8A to 8C are reference diagrams for explaining an operation of an image display device, according to an embodiment.

BEST MODE

Figure 2:
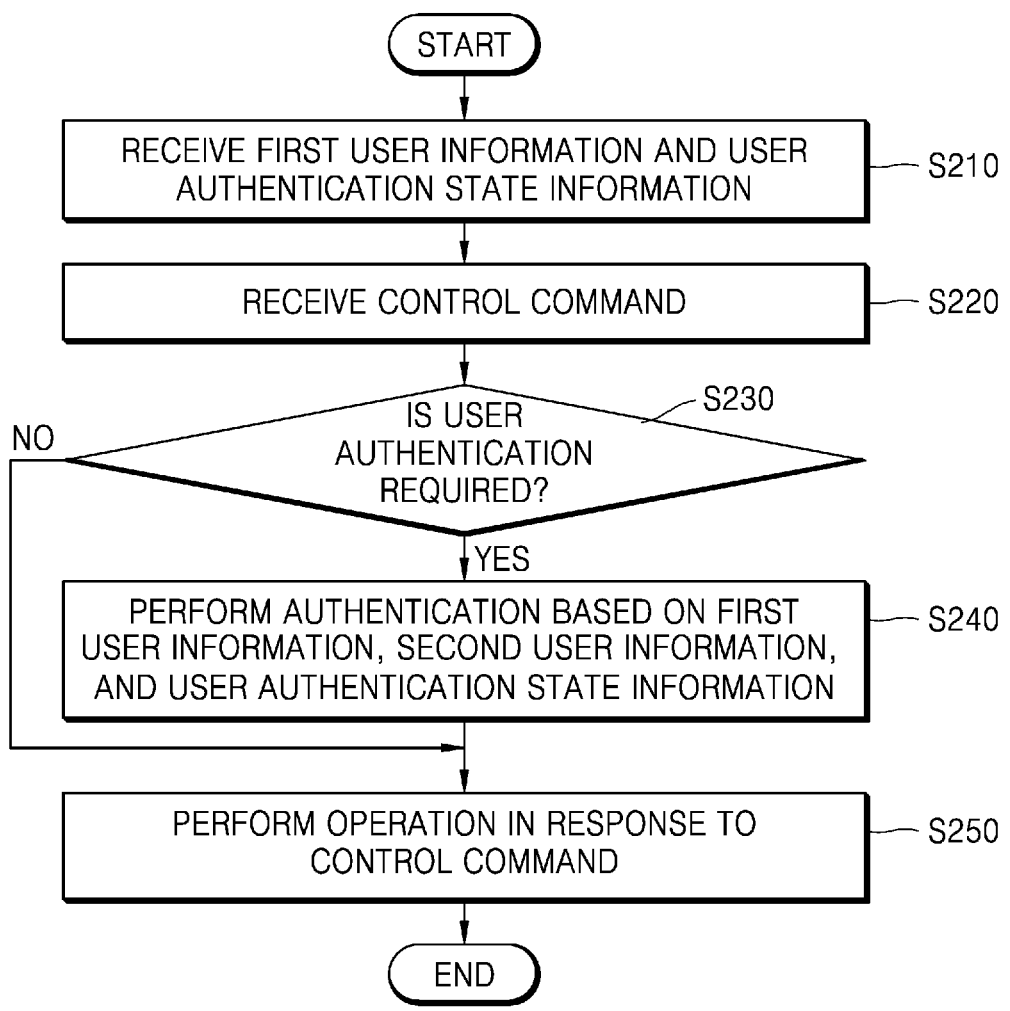
FIG. 2 is a flowchart of a method of operating an image display device, according to an embodiment.

An image display device according to an embodiment may include: a communication unit configured to receive, from a control device, a control command for controlling an operation of the image display device; a memory storing one or more instructions; and a processor configured to execute the one or more instructions stored in the memory, wherein the processor is configured to execute the one or more instructions to: receive first user information about a first user corresponding to a user of the control device and authentication state information representing user authentication state in the control device; when the control command includes an operation request that requires authentication, perform the authentication based on the first user information, the authentication state information, and second user information about a second user corresponding to a user of the image display device; and perform the operation in response to the control command.

The control command according to an embodiment may include the first user information and the authentication state information.

The first user information according to an embodiment may include account information of the first user, and the second user information may include account information of the second user.

The authentication state information according to an embodiment may include information representing a state in which the authentication is completed in the control device by using biometric information of the first user.

The authentication state information according to an embodiment may include information representing a state in which a lock screen is unlocked in the control device by using biometric information of the first user.

The processor according to an embodiment may be further configured to, when the first user information and the second user information match and the authentication state information includes information representing a state in which the authentication is completed in the control device by using biometric information of the first user, perform the operation in response to the control command.

The processor according to an embodiment may be further configured to, when the first user information and the second user information do not match, perform account login by using the first user information.

The image display device according to an embodiment may further include a display, and the processor may be further configured to, when the first user information and the second user information do not match, control the display to display a screen for requesting authentication information.

The image display device according to an embodiment may further include a display, and the processor may be further configured to, when the authentication state information is not in a preset state, control the display to display a screen for requesting authentication information.

The processor according to an embodiment may be configured to transmit the first user information to an external server, receive a result of performing the authentication on the first user, and, based on the result, perform the operation in response to the control command.

A method of operating an image display device according to an embodiment may include: receiving first user information about a first user corresponding to a user of a control device and authentication state information representing a user authentication state in the control device; receiving, from the control device, a control command for controlling an operation of the image display device; when the control command includes an operation request that requires authentication, performing the authentication based on the first user information, the authentication state information, and second user information about a second user corresponding to a user of the image display device; and performing the operation in response to the control command.

A computer program product according to an embodiment may include one or more computer-readable recording media storing a program for executing operations of receiving first user information about a first user corresponding to a user of a control device and authentication state information representing a user authentication state in the control device; receiving, from the control device, a control command for controlling an operation of the image display device; when the control command includes an operation request that requires authentication, performing the authentication based on the first user information, the authentication state information, and second user information about a second user corresponding to a user of the image display device; and performing the operation in response to the control command.

MODE OF DISCLOSURE

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, if it is assumed that a certain part includes a certain component, the term 'including' means that a corresponding component may further include other components unless a specific meaning opposed to the corresponding component is written. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

FIG. 1 is a diagram of an image display device and a control device, according to an embodiment.

An image display device 100 according to an embodiment may be a television (TV), but is merely an example, and may be implemented in various forms including a display. For example, the image display device 100 may be implemented as various types of electronic devices such as a mobile phone, a tablet PC, a digital camera, a camcorder, a laptop computer, a desktop computer, an electronic book terminal, a digital broadcasting terminal, a personal digital assistant (PDA), a portable multimedia player (PMP), a navigation device, an MP3 player, a wearable device, and the like. Also, the image display device 100 may be fixed or movable, and may be a digital broadcast receiver capable of receiving digital broadcast. Also, the image display device 100 may be implemented as not only a flat display device but also a curved display device having a curvature or a flexible display device capable of adjusting a curvature. An output resolution of the image display device 100 may include, for example, a high definition (HD), a full HD, an ultra HD, or a resolution that is clearer than the ultra HD.

A control device 2000 according to an embodiment may be implemented in various forms of electronic devices. For example, the control device 2000 may be implemented in various forms of electronic devices for controlling the image display device 100 such as a remote control, a mobile phone, a smart phone, a laptop computer, a tablet PC, a wearable device, and the like.

In an embodiment of the specification, the term "user" refers to a person who controls a function or an operation of the image display device, and may include a manager or an installation engineer.

The image display device 100 according to an embodiment may communicate with the control device 2000. For example, the image display device 100 may transmit or receive data to or from the control device 2000 by using short-range communication. In this regard, the short-range communication may include a Bluetooth method, a Wi-Fi method, a near-field communication (NFC) method, an infrared method, a Zigbee method, and the like, but is not limited thereto. The image display device 100 according to an embodiment may transmit, to the control device 2000, device identification information of the image display device 100, and the control device 2000 may transmit, to the image display device 100, device identification information of an external device. In this regard, the device identification information is unique information for distinguish a device from other devices, and may include, for example, a model name of the device, a serial number of the device, and the like.

The image display device 100 according to an embodiment may broadcast device identification information to the outside by using Bluetooth Low Energy (BLE) communication. Accordingly, the control device 2000 may recognize presence of the image display device 100 present on the periphery by receiving the device identification information of the image display device 100, and may communicate with the image display device 100. However, the disclosure is not limited to this example.

The control device 2000 according to an embodiment may obtain a user's biometric information. For example, the control device 2000 may obtain the user's fingerprint information by using a fingerprint sensor, and may obtain the user's face information, the user's iris information, the user's vein information, and the like, by using a camera. Also, the user's voice information may be obtained by using a microphone. The control device 2000 may perform biometric authentication by using the user's biometric information. For example, the control device 2000 may unlock the control device 2000 by using a fingerprint recognition method using fingerprint information of a control device user of the control device 2000.

The control device 2000 may control the image display device 100 by using short-range communication including infrared or Bluetooth. The control device 2000 according to an embodiment may execute a remote control application, and may control a function of the image display device 100 by using an input interface 50 (e.g., a key input interface, a touch input interface, a voice input interface, a motion input interface, etc.) provided by the remote control application. For example, the input interface 50 provided by the remote control application may include a channel up/down key, a volume up/down key, a power on/off key, and the like, but is not limited thereto.

The image display device 100 may receive a control command from the control device 2000 and may perform operations in response to the control command. The image display device 100 may receive a request for an operation that requires authentication. For example, as shown in FIG. 1, when a channel to be currently displayed by the image display device 100 is an adult-only channel, adult authentication is required to display the adult-only channel.

In this regard, the image display device 100 may perform authentication based on information representing a state in which a user is authenticated, user information of the control device 2000, and user information of the image display device 100 by using biometric authentication performed by the control device 2000. Accordingly, the image display device 100 may perform an operation (e.g., displaying of an adult-only channel) that requires authentication without not performing an additional authentication procedure such as a PIN number input, a password input, and the like.

FIG. 2 is a flowchart of a method of operating an image display device, according to an embodiment.

Referring to FIG. 2, the image display device 100 according to an embodiment may receive first user information and user authentication state information of the control device 2000 (operation S210).

For example, the first user information is user information corresponding to the control device user (e.g., a first user), and may include a user's account, an ID, a password, and the like.

In addition, the control device 2000 may be in a state in which user authentication is performed. For example, the control device 2000 may be in an unlocked state via biometric authentication. In this regard, as a biometric authentication method, face recognition, fingerprint recognition, iris recognition, vein recognition, voice recognition, and the like may be used. The user authentication state information may include information representing a state that biometric authentication is completed in the control device 2000 by using biometric information of the control device user.

The control device 2000 may transmit the first user information and the user authentication state information to the image display device 100.

In addition, the control device 2000 may control a function of the image display device 100. For example, a remote control application may be installed in the control device 2000, and the control device 2000 may control a function of the image display device 100 by using the remote control application. The control device 2000 may transmit a control command to the image display device 100. The control device 2000 may transmit the first user information and the user authentication state information to the image display device 100 when the remote control application is executed. Alternatively, the control device 2000 may include the first user information and the user authentication state information in the control command, and may transmit the control command to the image display device 100. However, the disclosure is not limited to this example.

The image display device 100 may receive the control command (operation S220), and may perform an operation in response to the received control command (operation S250). When the control command includes an operation request that requires user authentication, the image display device 100 may perform the user authentication based on the first user information, second user information, and the user authentication state information (operation S240).

In this regard, the operation that requires the user authentication may include displaying of adult-only content, displaying of an adult-only channel, purchasing of content, and the like, but is not limited thereto. The image display device 100 may perform the authentication based on whether the first user information matches the second user information and whether the user authentication state information represents a state in which the authentication for the control device user is completed.

When the user authentication is completed based on the first user information, the second user information corresponding to a user of the image display device 100, and the user authentication state information, the image display device 100 may perform the operation that requires the authentication (operation S250).

Figure 3:
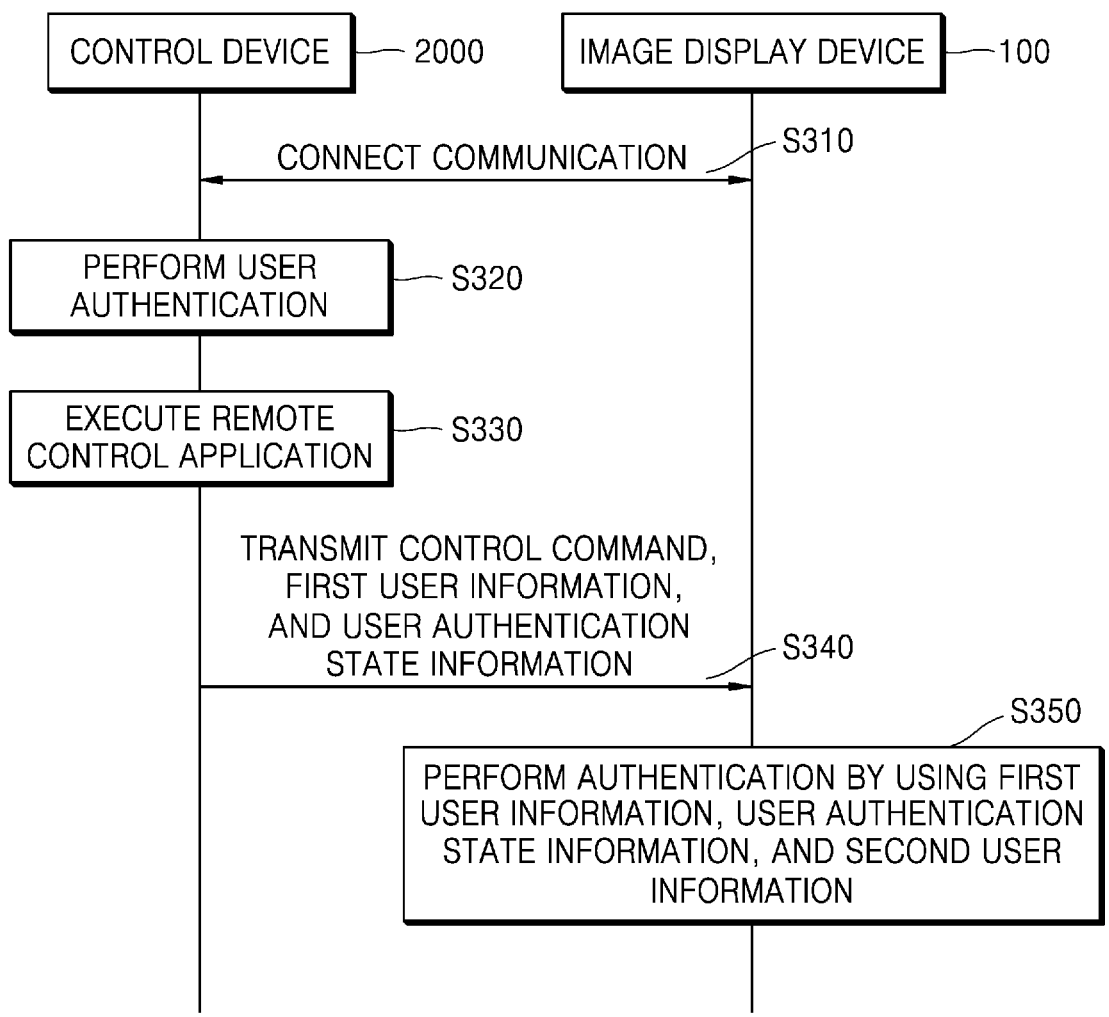
FIG. 3 is a flowchart of a method, performed by an image display device, of performing authentication, according to an embodiment.
Figure 4:
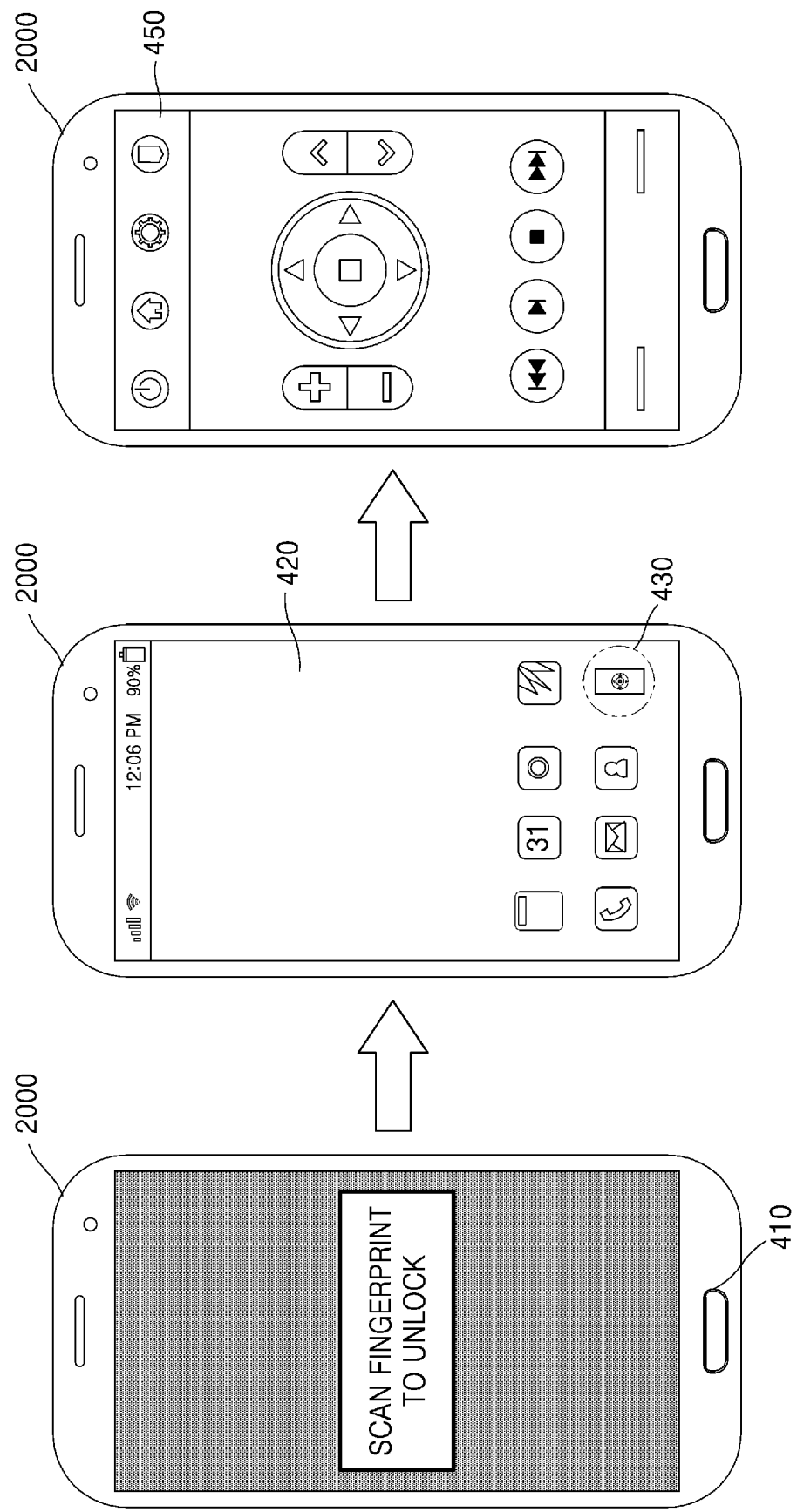
FIG. 4 is a reference diagram for explaining an operation of a control device to enable an image display device to perform authentication.

FIG. 3 is a flowchart of a method, performed by an image display device, of performing authentication, according to an embodiment, and FIG. 4 is a reference diagram for explaining an operation of a control device to enable an image display device to perform authentication.

Referring to FIG. 3, the control device 2000 and the image display device 100 may communicate with each other (operation S310). For example, when the control device 2000 and the image display device 100 are present within a preset distance range, the control device 2000 and the image display device 100 may transmit and receive device identification information to and from each other by using short-range communication. Accordingly, the control device 2000 may recognize presence of the image display device 100 present within the preset distance range from the control device 2000, and the image display device 100 may recognize presence of the control device 2000 present within the preset distance range from the image display device 100. The control device 2000 and the image display device 100 may be connected to each other by using short-range communication.

The control device 2000 according to an embodiment may perform user authentication (operation S320). For example, the control device 2000 may perform biometric authentication by using biometric information of the control device user. In this regard, as a biometric authentication method, face recognition, fingerprint recognition, iris recognition, vein recognition, voice recognition, and the like may be used. In addition, the control device 2000 may perform the biometric authentication to perform unlocking, payment by card, and displaying of adult-only content, and the like.

For example, referring to FIG. 4, the control device 2000 may release a lock mode by using the fingerprint recognition. The control device 2000 may include a fingerprint recognition sensor 410, when a user puts a finger on the fingerprint recognition sensor 410, the user's fingerprint is sensed, and when the fingerprint matches a pre-registered fingerprint, a lock may be released.

When the lock mode is released, the control device 2000 may display a home screen 420 on a display. Application icons installed in the control device 2000 are displayed on the home screen 420, and when an application icon to be executed is selected, a selected application may be executed.

A remote control application may be installed in the control device 2000, and a remote control application icon 430 may be displayed. When the remote control application icon 430 is selected, the control device 2000 may provide an input interface for controlling a function of the image display device 100 connected to the control device 2000. The control device 2000 may execute the remote control application based on a user input (operation S330). For example, when the remote control application is executed, a touch input interface 450 including a channel up/down key, a volume up/down key, a power on/off key, and the like may be displayed on the display of the control device 2000, but disclosure is not limited thereto.

In addition, when the remote control application is executed, the control device 2000 may transmit first user information and user authentication state information of the control device user to the image display device 100 (operation S340). For example, the first user information is user information corresponding to the control device user (e.g., a first user), and may include a user's account, an ID, a password, and the like.

The user authentication state information is information representing the user's authentication state in the control device 2000, and may include information representing a state in which biometric authentication is completed by using biometric information of the control device user.

The control device 2000 may transmit a control command for controlling a function of the image display device 100, and may include the first user information and the user authentication state information in the control command and transmit the control command.

When a request to perform an operation that requires authentication is received, the image display device 100 may perform the authentication based on the first user information and the user authentication state information, which are received from the control device 2000, and second user information of a user of the image display device 100 (operation S350).

This will be described in detail with reference to FIG. 5.

Figure 5:
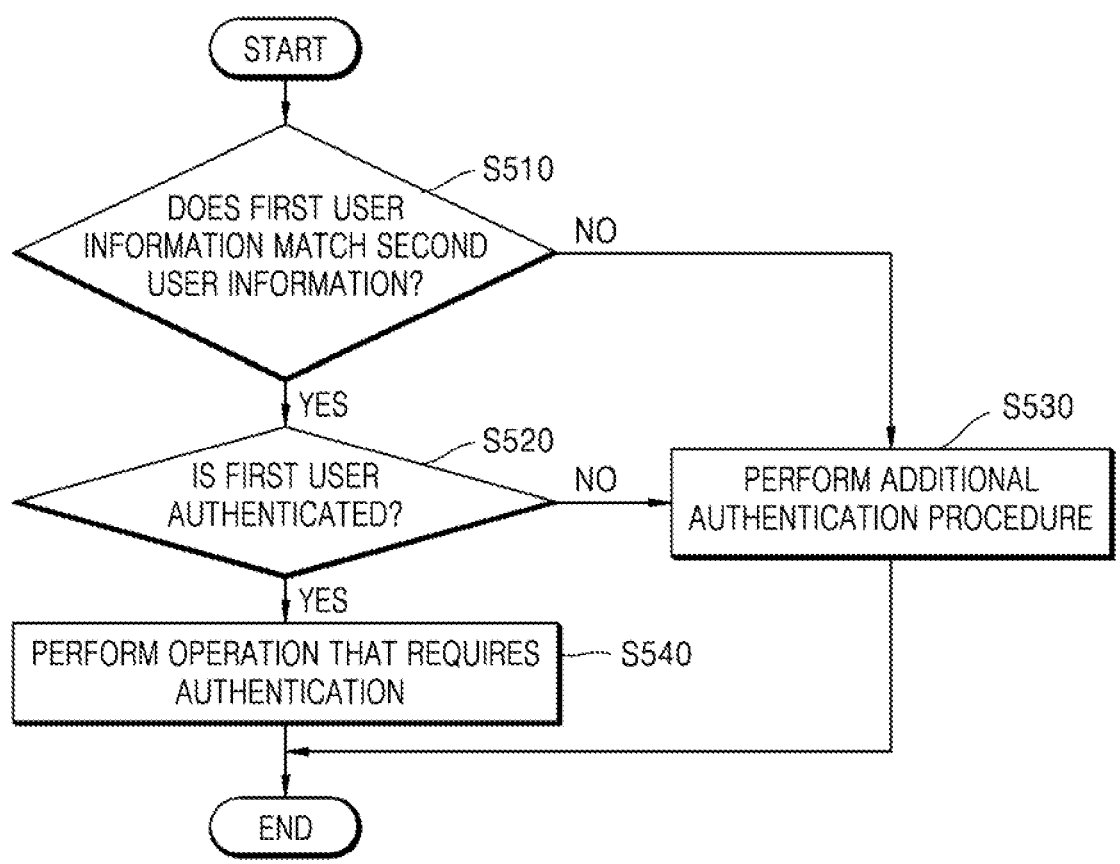
FIG. 5 is a flowchart of a method, performed by an image display device, of performing authentication, according to an embodiment.

FIG. 5 is a flowchart of a method, performed by an image display device, of performing authentication, according to an embodiment.

Referring to FIG. 5, the image display device 100 may determine whether the first user information received from the control device 2000 matches the second user information corresponding to the user of the image display device 100 (operation S510).

The second user information is user information corresponding to the user of the image display device 100 and may include the user's account, an ID, a password, and the like.

When the first user information does not match the second user information, the image display device 100 may perform an additional authentication procedure (operation S530). For example, user authentication information such as a PIN number input, a password input, and the like is received, and based on the received information, authentication may be performed.

In contrast, when the first user information matches the second user information, the image display device 100 may determine whether the control device user (a first user) is authenticated from the control device 2000 (operation S520). For example, based on the user authentication state information received from the control device 2000, the image display device 100 may identify that the control device user is authenticated.

In addition, the image display device 100 may determine an authentication level of the control device user. For example, when authentication is completed via biometric authentication, it may be determined that an authentication level is high, but the disclosure is not limited to this example.

When it is identified that the control device user is authenticated, the image display device 100 may perform an operation that requires authentication (operation S540). In addition, according to the determined authentication level, the image display device 100 may perform the operation that requires the authentication in a limited manner. For example, when the determined authentication level is low, the image display device 100 may perform a first operation and may not perform a second operation, among operations that require authentication. In addition, the image display device 100 may request additional authentication information to perform the second operation. In contrast, when the determined authentication level is high, the image display device 100 may perform both the first operation and the second operation. However, the disclosure is not limited to this example.

Figure 6:
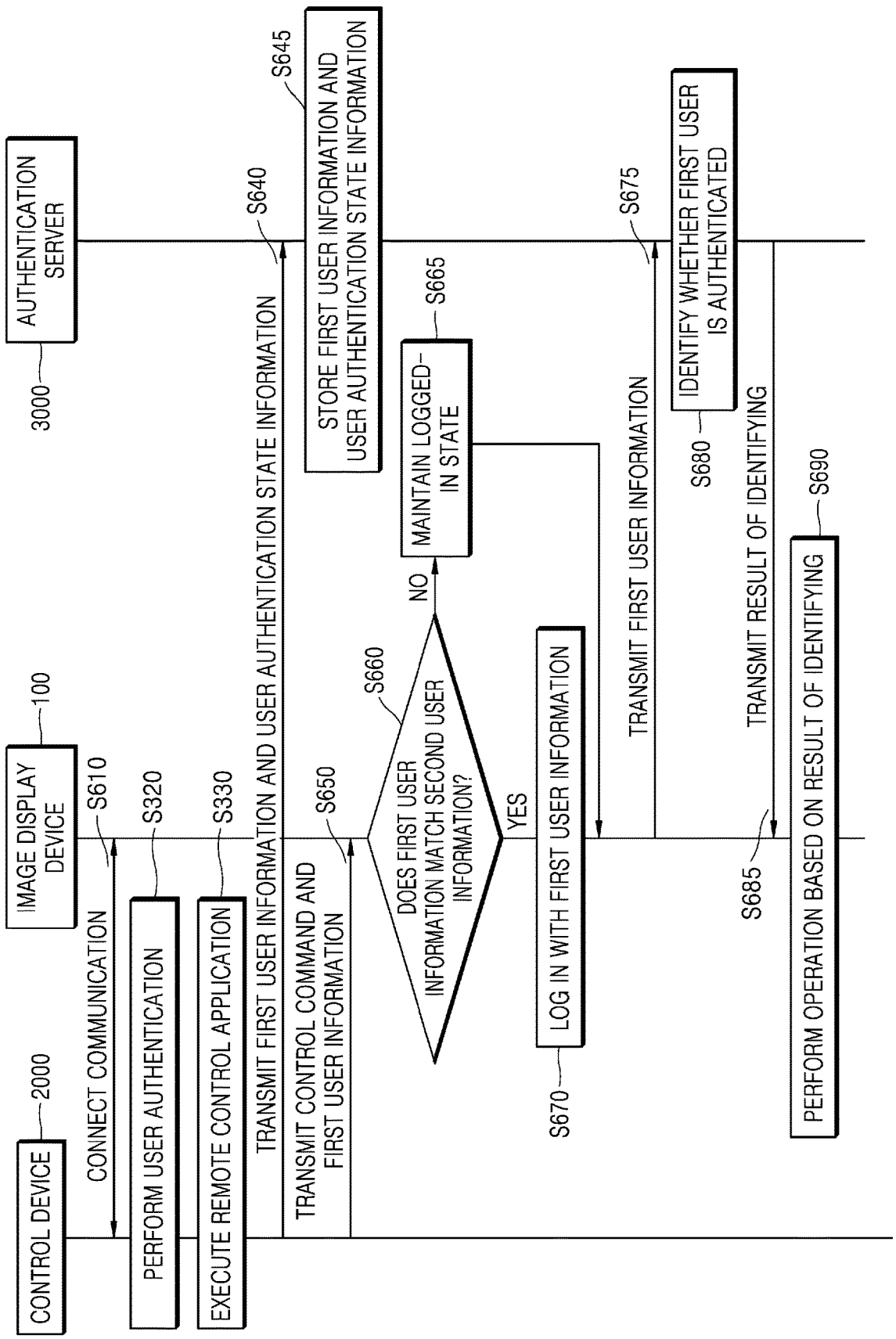
FIG. 6 is a flowchart of a method of performing authentication, according to an embodiment.

FIG. 6 is a flowchart of a method of performing authentication, according to an embodiment.

Referring to FIG. 6, the control device 2000 and the image display device 100 may communicate with each other (operation S610). Operation 610 (S610) of FIG. 6 corresponds to Operation 310 (S310) of FIG. 3, and thus detailed descriptions thereof are omitted.

The control device 2000 may perform user authentication (operation S620). Operation 620 (S620) of FIG. 6 corresponds to Operation 320 (S320) of FIG. 3, and thus detailed descriptions thereof are omitted.

The control device 2000 may perform a remote control application (operation S630), and when the remote control application is executed, the control device 2000 may transmit first user information and user authentication state information to an authentication server 3000 (operation S640).

The authentication server 3000 according to an embodiment may store the first user information and the user authentication state information, which are received from the control device 2000 (operation S645).

The control device 2000 may transmit a control command for controlling a function of the image display device 100 to the image display device 100 by using the remote control application, and may also transmit the first user information.

In this regard, the control device 2000 may include the first user information in the control command and transmit the control command.

When a request to perform an operation that requires authentication is received, the image display device 100 may determine whether the first user information received from the control device 2000 matches second user information of the image display device 100 (operation S660).

When the first user information matches the second user information, the image display device 100 may maintain a state of being logged into an account with the second user information (operation S665).

In contrast, when the first user information does not match the second user information, the image display device 100 may perform account login by using the first user information (operation S670).

The image display device 100 may transmit the first user information to the authentication server 3000 (operation S675). The authentication server 3000 may identify whether the control device user (a first user) is an authenticated user, based on the first user information received from the image display device 100 (operation S680).

For example, the authentication server 3000 may identify that the control device user (a first user) is authenticated, based on the pre-stored first user information and the pre-stored user authentication state information.

The authentication server 3000 may transmit a result of the identifying to the image display device 100 (operation S685), and the image display device 100 may perform operations that require authentication, based on the result of the identifying received from the authentication server 3000 (operation S690).

As a result of the identifying in the authentication server 3000, when the first user is not authenticated, the image display device 100 may perform an additional authentication procedure. For example, user authentication information such as a PIN number input, a password input, and the like is received, and based on the received information, when authentication is completed, operations that require the authentication may be performed.

Figure 7B:
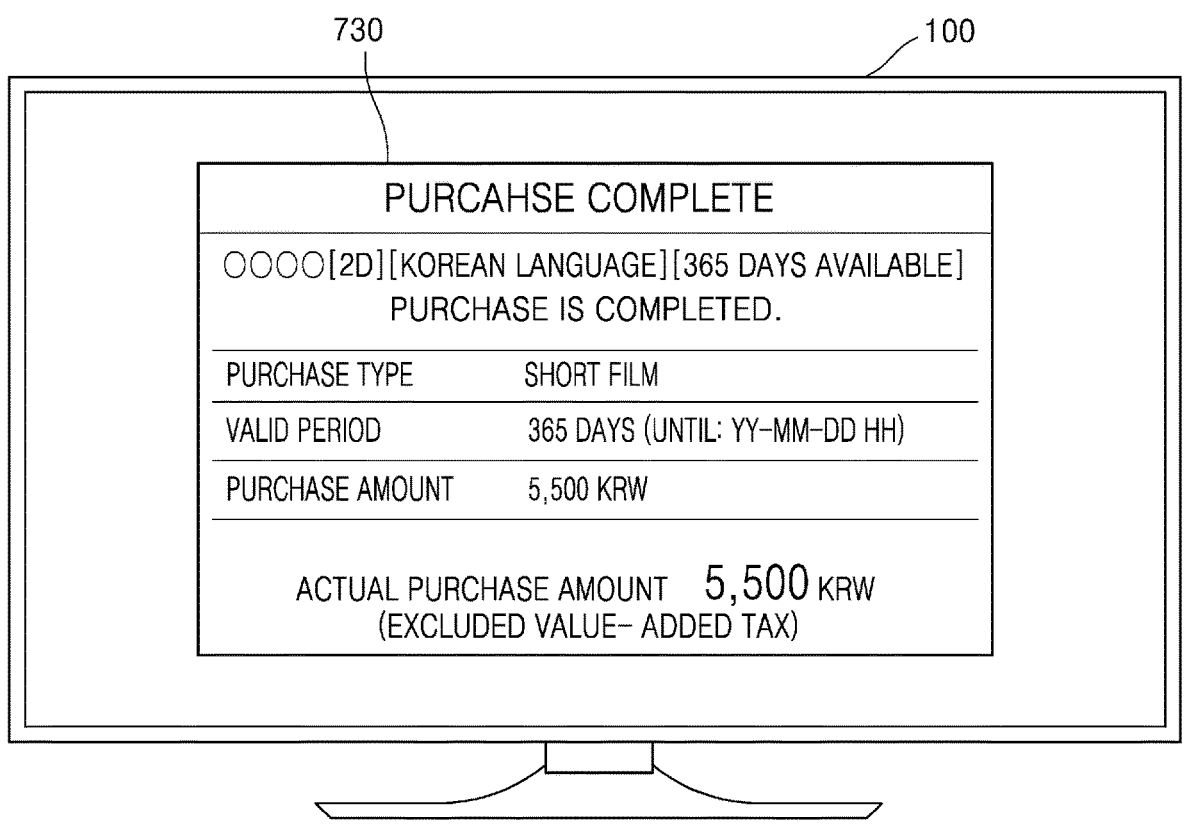
Figure 7C:
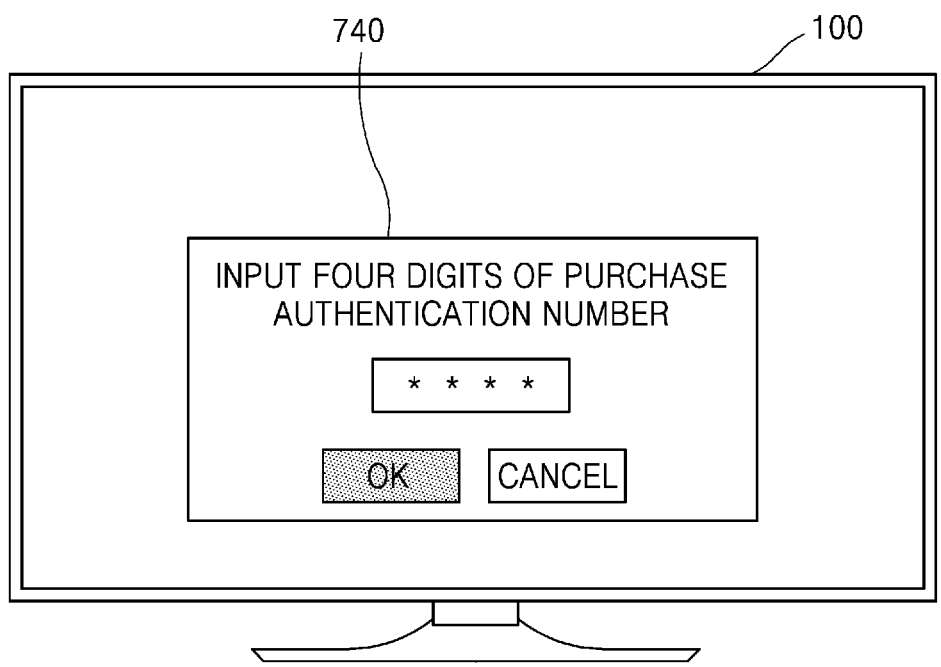

FIGS. 7A to 7C are reference diagrams for explaining an operation of an image display device, according to an embodiment.

Referring to FIG. 7A, the control device 2000 according to an embodiment may be in a state in which user authentication is performed. For example, the control device 2000 may be unlocked by using a biometric authentication method (e.g., face recognition, fingerprint recognition, iris recognition, vein recognition, voice recognition, etc.). The control device 2000 may transmit, to the image display device 100, first user information corresponding to the control device user and user authentication state information representing that the control device user is authenticated in the control device 2000.

In addition, a remote control application is installed in the control device 2000, and the control device 2000 may execute the remote control application, based on a user input. The remote control application may provide an input interface for controlling a function of the image display device 100 connected to the control device 2000.

The image display device 100 according to an embodiment may display a content purchase screen 710 in response to a control command received from the control device 2000. The control device 2000 may receive an input from a user by using the remote control application, and may transmit the control command based on the user input to the image display device 100. In this regard, the control command may be transmitted by using short-range communication including Bluetooth, infrared communication, and the like. However, the disclosure is not limited to this example.

For example, when a user wants to purchase content, the user may input of selecting a purchase button 720 included in the content purchase screen 710 by using the input interface displayed on the control device 2000. Accordingly, the control device 2000 may transmit, to the image display device 100, the control command for performing an operation corresponding to the selecting of the purchase button 720. A header area of the control command may include the first user information and the user authentication state information, but is not limited thereto.

In the image display device 100, an operation of purchasing content may be an operation that requires authentication. Accordingly, the image display device 100 may perform the authentication based on the first user information and the user authentication state information, which are received from the control device 2000, and second user information corresponding to a user of the image display device 100.

When the first user information matches the second user information and the user authentication state information representing that the control device user is authenticated in the control device 2000 is identified, the image display device 100 according to an embodiment may perform operations corresponding to the purchasing of the content without an additional authentication procedure. For example, as shown in FIG. 7B, the image display device 100 may display a content purchase completion screen 730.

In contrast, when the first user information does not match the second user information and the user authentication state representing that the control device user is authenticated in the control device 2000 is not identified, the image display device 100 may perform an additional authentication procedure. For example, as shown in FIG. 7C, the image display device 100 may display a screen 740 for requesting an input of a purchase authentication number for purchasing content. A user may input the purchase authentication number by using the input interface the input interface 50 of the control device 2000, and when the received purchase authentication number and a preset purchase authentication number are the same, the image display device 100 may perform an operation corresponding to the purchasing of the content and may display the content purchase completion screen 730 shown in FIG. 7B.

Figure 8B:
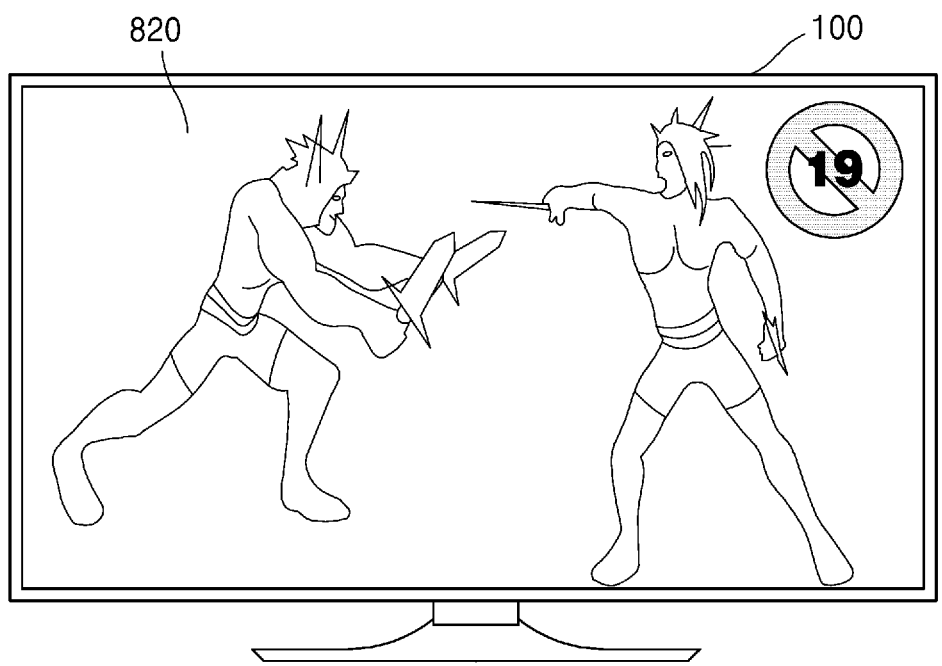
Figure 8C:
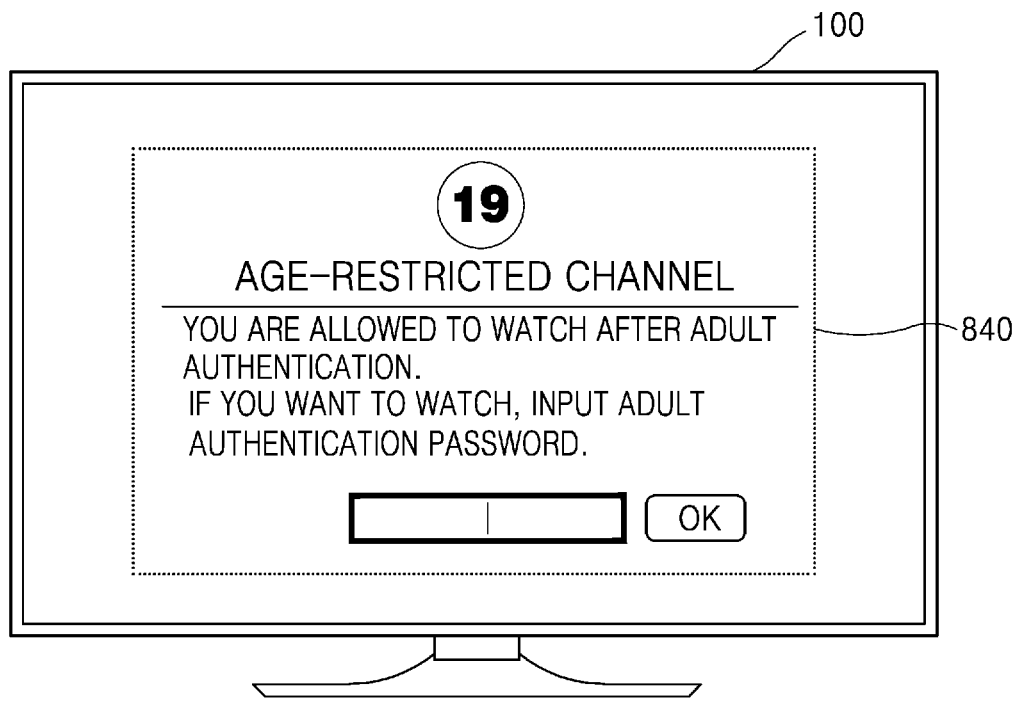

FIGS. 8A to 8C are reference diagrams for explaining an operation of an image display device, according to an embodiment.

Referring to FIG. 8A, the control device 2000 according to an embodiment may be in a state in which user authentication is performed, and may execute a remote control application. In addition, the control device 2000 may transmit, to the image display device 100, first user information corresponding to the control device user and user authentication state information representing that the control device user is authenticated in the control device 2000. This has been described in detail in FIG. 7A, and thus redundant descriptions are omitted.

The image display device 100 according to an embodiment may perform an operation of switching a channel in response to a control command received from the control device 2000. For example, the control device 2000 may receive a channel up/down key input from a user by using the remote control application, and may transmit a channel-up or channel-down command to the image display device 100. In this regard, the control command may be transmitted by using short-range communication including Bluetooth, infrared communication, and the like. A header area of the channel-up or channel-down command may include the first user information and the user authentication state information, but is not limited thereto.

In a case of switching to a channel of a next number of a current channel number in response to the channel-up command, when the channel of the next number is an adult-only channel, an operation of the switching to the channel of the next number may be an operation that requires user authentication. Accordingly, the image display device 100 may perform the authentication based on the first user information and the user authentication state information, which are received from the control device 2000, and second user information corresponding to a user of the image display device 100.

When the first user information matches the second user information and the user authentication state representing that the control device user is authenticated in the control device 2000 is identified, the image display device 100 according to an embodiment may switch to the next channel (e.g., the adult-only channel) without an additional authentication procedure. For example, as shown in FIG. 8B, a screen 820 corresponding to the next channel may be displayed.

In contrast, when the first user information does not match the second user information and the user authentication state representing that the control device user is authenticated in the control device 2000 is not identified, the image display device 100 may perform an additional authentication procedure. For example, as shown in FIG. 8C, the image display device 100 may display a screen 840 for requesting an adult authentication password. A user may input an adult authentication password by using the input interface 50 of the control device 2000, and when the adult authentication password and a preset password are the same, the image display device 100 may switch to the next channel and may display the screen 820 corresponding to the next channel shown in FIG. 8B.

Figure 9:
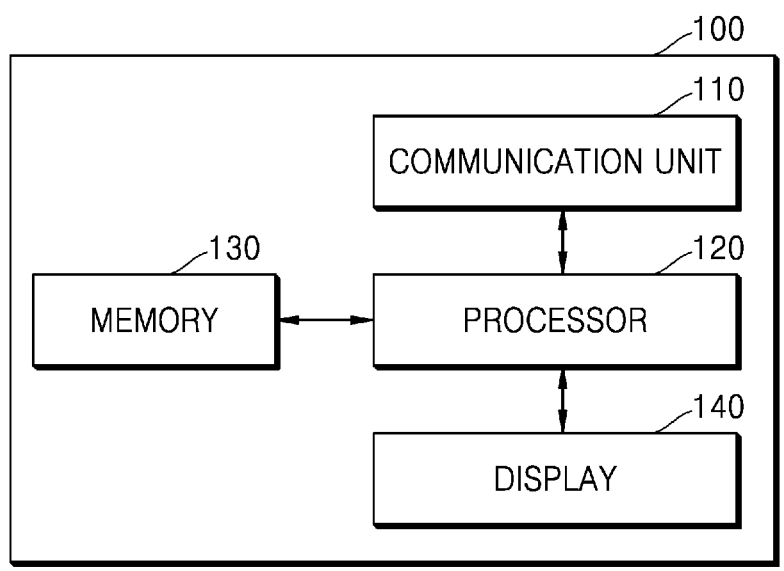
FIG. 9 is a block diagram of a configuration of an image display device, according to an embodiment.

FIG. 9 is a block diagram of a configuration of an image display device, according to an embodiment.

Referring to FIG. 9, the image display device 100 according to an embodiment may include a communication unit 110, a processor 120, a memory 130, and a display 140.

The communication unit 110 according to an embodiment may transmit or receive data or a signal to or from an external device or a server under the control by the processor 120. The processor 120 may transmit or receive content to or from an external device connected via the communication unit 110, or may download an application from the external device or perform web browsing.

The communication unit 110 may transmit or receive data or a signal by at least one of methods such as a wireless LAN (e.g., Wi-Fi), Bluetooth, and wired Ethernet in response to a performance and a structure of the image display device 100.

The communication unit 110 according to an embodiment may communicate with the control device 2000 according to an embodiment by using short-range communication. For example, the communication unit 110 may transmit or receive data or a signal to or from the control device 2000 by using a Bluetooth method, a Wi-Fi method, an NFC method, an infrared method, a Zigbee method, and the like.

The communication unit 110 may receive, from the control device 2000, a control command for controlling an operation of the image display device 100, and may perform operations in response to the control command. In addition, the communication unit 110 may receive, from the control device 2000, first user information corresponding to the control device user and user authentication state information.

In addition, the communication unit 110 may communicate with the authentication server 3000 according to an embodiment. For example, the communication unit 110 may transmit, to the authentication server 3000, the first user information received from the control device 2000, and may receive information about a result of authentication from the authentication server 3000. However, the disclosure is not limited to this example.

The processor 120 according to an embodiment may execute one or more programs stored in the memory 130. The processor 120 may include a single core, a dual core, a triple core, a quad core, and a core of a multiple thereof. The processor 120 may also include a plurality of processors. For example, the processor 120 may be implemented with a main processor (not shown) and a sub processor (not shown) which operates in a sleep mode.

The memory 130 according to an embodiment may store various data, programs, or applications for driving and controlling the image display device 100.

Also, the programs stored in the memory 130 may include one or more instructions. The programs (e.g., one or more instructions) or applications stored in the memory 130 may be executed by the processor 120.

The processor 120 according to an embodiment may be configured to execute the one or more instructions stored in the memory 130 to, when the control command received from the control device 2000 includes an operation request that requires user authentication, perform the user authentication based on the first user information, second user information corresponding to a user of the image display device 100, and the user authentication state information.

For example, when the first user information matches the second user information and it is identified that the control device user has been authenticated, the processor 120 is configured to determine that authentication is succeeded and perform operations that require the authentication. In addition, the processor 120 may be configured to determine an authentication level based on the user authentication state information and perform the operations that require the authentication in a limited manner according to the determined authentication level.

Also, the processor 120 may be configured to request an additional authentication procedure according to a result of performing the authentication. For example, when the first user information does not match the second user information or the user authentication state information is not the same as a preset state (e.g., represents a state that is not authenticated by the control device or is not a preset authentication level), the processor 120 may be configured to control a screen for requesting authentication information to be displayed on the display 140.

In addition, the processor 120 may transmit, to the authentication server 3000, the first user information received from the control device 2000, and based on a result of authentication received from the authentication server 3000, may perform operations that require the authentication.

The display 140 according to an embodiment may generate a driving signal by converting an image signal, a data signal, an on-screen display (OSD) signal, a control signal, and the like which are processed by the processor 120. The display 140 may be implemented with a PDP, an LCD, an OLED, a flexible display, and the like, and may also be implemented with a three-dimensional (3D) display. Also, the display 140 may include a touch screen and thus may be used as an input device as well as an output device.

When an additional authentication procedure is necessary, the display 140 according to an embodiment may display a screen for requesting authentication information under the control by the processor 120.

Figure 10:
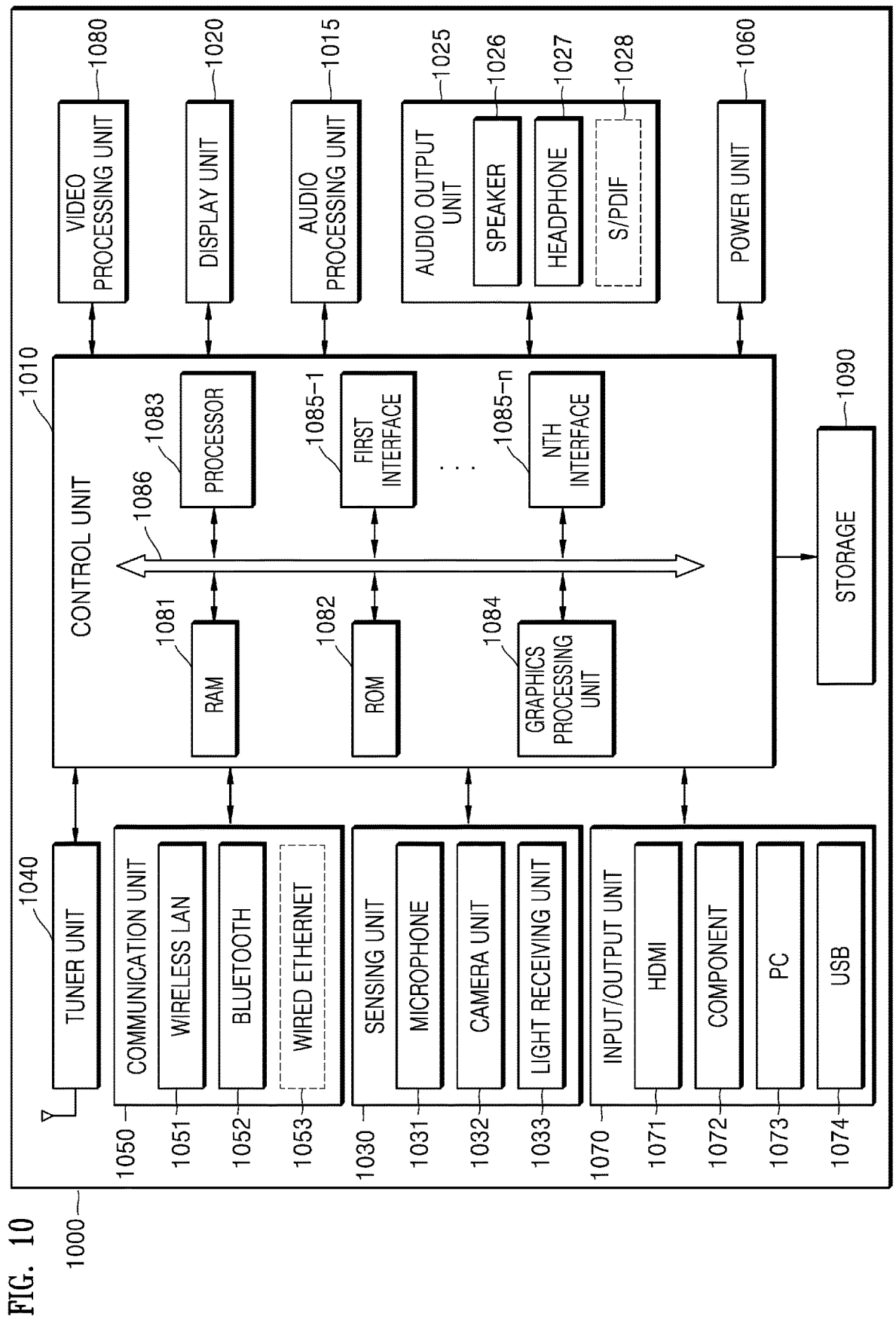
FIG. 10 is a block diagram of a configuration of an image display device, according to another embodiment.

FIG. 10 is a block diagram of a configuration of an image display device, according to another embodiment. An image display device 1000 of FIG. 10 may be an embodiment of the image display device 100 100 of FIG. 1.

Referring to FIG. 10, the image display device 1000 according to an embodiment may include a tuner unit 1040, a control unit 1010, a display unit 1020, a communication unit 1050, a sensing unit 1030, an input/output unit 1070, a video processing unit 1080, an audio processing unit 1015, a storage 1090, and a power unit 1060.

The communication unit 1050 of FIG. 10 corresponds to the communication unit 110 of FIG. 9, the control unit 1010 of FIG. 10 corresponds to the processor 120 of FIG. 9, the storage 1090 of FIG. 10 corresponds to the memory 130 of FIG. 9, and the display unit 1020 of FIG. 10 corresponds to the display 140 of FIG. 9, and thus redundant descriptions are omitted.

The tuner unit 1040 may tune and select only a frequency of a channel which the image display device 1000 wants to receive from among many radio wave components via amplification, mixing, resonance, and the like of a broadcast signal received in a wired or wireless manner. A broadcast signal may include audio, video, and additional information (e.g., electronic program guide (EPG)).

The tuner unit 1040 may receive a broadcast signal from a frequency band corresponding to a channel number in response to a user input (e.g., a control signal received from a control device, for example, a channel number input, a channel up/down input, and a channel input on an EPG screen).

The tuner unit 1040 may receive a broadcast signal from various sources such as terrestrial broadcast, cable broadcast, satellite broadcast, Internet broadcast, and the like. The tuner unit 1040 may receive a broadcast signal from a source such as analog broadcast, digital broadcast, and the like.

The video processing unit 1080 may process video data received by the image display device 1000. The video processing unit 1080 may perform, on the video data, various image processing such as decoding, scaling, noise filtering, frame rate converting, resolution changing, and the like.

The sensing unit 1030 may sense user's voice, user's image, or user's interaction, and include a microphone 1031, a camera unit 1032, and a light receiving unit 1033.

The microphone 1031 may receive voice uttered by a user. The microphone 1031 may convert the received voice to an electrical signal and output the signal to the control unit 1010. The user voice may include, for example, voice corresponding to the menu or function of the image display device 1000.

The camera unit 1032 may receive an image (e.g., consecutive frames) corresponding to a user's motion including gesture within a camera recognition range. The control unit 1010 may select a menu displayed on the image display device 1000 by using a recognition result of the received motion or perform control corresponding to the motion recognition result.

The light receiving unit 1033 may receive an optical signal (including a control signal) received from an external control device, through a light window (not shown) of a bezel of the display unit 1020, and the like. The light receiving unit 1033 may receive an optical signal corresponding to a user input (e.g., a touch, a press, a touch gesture, voice, or a motion) from the control device. A control signal may be extracted from the received optical signal under the control by the control unit 1010.

The input/output unit 1070 may receive, under the control by the control unit 1010, video (e.g., a moving image, etc.), audio (e.g., voice, music, etc.), additional information (e.g., EPG, etc.), and the like, from the outside of the image display device 1000. The input/output unit 1070 may include one of a high-definition multimedia interface (HDMI) port 1071, a component jack 1072, a PC port 1073, and a USB port 1074. The input/output unit 1070 may include a combination of a HDMI port 1071, a component jack 1072, a PC port 1073, and a USB port 1074.

The control unit 1010 may control the overall operation of the image display device 1000 and a signal flow between internal components of the image display device 1000, and perform a function of processing data. In response to a user input or a preset and stored condition being satisfied, the control unit 1010 may execute operation system (OS) and various applications stored in the storage 1090.

The control unit 1010 may include random access memory (RAM) 1081 for storing the signal or data output from the outside of the image display device 1000, or used as a storage area corresponding to various jobs performed in the image display device 1000, read only memory (ROM) 1082 for storing a control program to control the image display device 1000, and a processor 1083.

The graphics processing unit 1084 may generate a screen including various objects such as an icon, an image, a text, and the like, by using an operating unit (not shown) and a rendering unit (not shown). The operating unit may calculate an attribute value such as a coordinate value, a shape, a size, a color, and the like to display respective objects according to the layout of a screen by using a user input sensed via the sensing unit 1030. The rendering unit may generate a screen of various layouts including objects based on the attribute value calculated by the operating unit. The screen generated by the rendering unit is displayed in a display area of the display unit 1020.

First to nth interfaces 1085-1 to 1085-*n* may be connected to the various components. One of the interfaces may be a network interface connected to an external device via a network.

The RAM 1081, the ROM 1082, the processor 1083, the graphics processing unit 1084, and the first to nth interfaces 1085-1 to 1085-*n* may be interconnected via an internal bus 1086.

In this embodiment, the term "control unit of an image display device" includes the processor 1083, the ROM 1082, and the RAM 1081.

The display unit 1020 may generate a driving signal by converting an image signal, a data signal, an OSD signal, a control signal, and the like, which are processed by the control unit 1010. The display unit 1020 may be implemented with a PDP, an LCD, an OLED, a flexible display, and the like, and may also be implemented with a three-dimensional (3D) display. In addition, the display unit 1020 may include a touch screen and thus may be used as an input device as well as an output device.

The audio processing unit 1015 may process audio data. The audio processing unit 1015 may perform, on audio data, various processing such as decoding, amplification, noise filtering, or the like. The audio processing unit 1015 may include a plurality of audio processing modules for processing audio corresponding to a plurality of items of content.

An audio output unit 1025 may output audio included in a broadcast signal received via the tuner unit 1040 under the control by the control unit 1010. The audio output unit 1025 may output audio (e.g., voice or sound) input via the communication unit 1050 or the input/output unit 1070. In addition, the audio output unit 1025 may output audio stored in the storage 1090 under the control by the control unit 1010. The audio output unit 1025 may include at least one of a speaker 1026, a headphone output terminal 1027, or a Sony/Philips digital interface (S/PDIF) output terminal 1028. The audio output unit 1025 may include a combination of the speaker 1026, the headphone output terminal 1027, and the S/PDIF output terminal 1028.

The power unit 1060 may supply power input from an external power source to components in the image display device 1000 under the control by the control unit 1010. In addition, the power unit 1060 may supply, to internal components, power output from one or two or more batteries (not shown) located in the image display device 1000 under the control by the control unit 1010.

The storage 1090 may store various data, programs, or applications to drive and control the image display device 1000 under the control by the control unit 1010. The storage 1090 may include a broadcast receiving module, a channel control module, a volume control module, a communication control module, a voice recognition module, a motion recognition module, a light receiving module, a display control module, an audio control module, an external input control module, a power control module, a power control module of an external device that is wirelessly connected (for example, through Bluetooth), a voice database (DB), or a motion database (DB), which are not illustrated. The modules and database of the storage 1090, which are not illustrated, may be implemented in the form of software to perform, in the image display device 1000, a broadcast receiving control function, a channel control function, a volume control function, a communication control function, a voice recognition function, a motion recognition function, a light receiving control function, a display control function, an audio control function, an external input control function, a power control function, or a power control function of an external device that is wirelessly (for example, through Bluetooth). The control unit 1010 may perform the respective function by using software stored in the storage 1090.

The block diagrams of the image display devices 100 and 1000 illustrated in FIGS. 9 and 10 are block diagrams for an embodiment. Each of the components in the block diagram may be integrated, added, or omitted according to the specification of the image display device 100 or 1000 that is actually implemented. That is, when necessary, two or more components may be integrated into one component or one component may be divided into two or more components. In addition, a function performed in each block is intended to describe embodiments of the disclosure, and a detailed operation or device thereof does not limit the scope of the disclosure.

Figure 11:
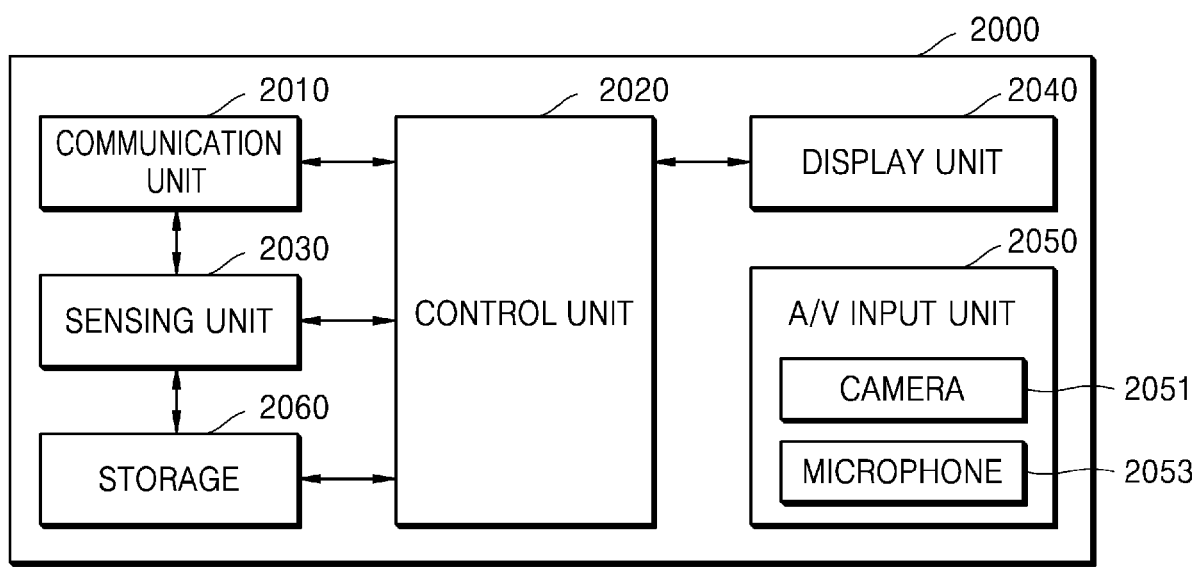
FIG. 11 is a block diagram of a configuration of a control device, according to an embodiment.

FIG. 11 is a block diagram of a configuration of a control device, according to an embodiment.

Referring to FIG. 11, the control device 2000 according to an embodiment may include a communication unit 2010, a sensing unit 2030, a storage 2060, a control unit 2020, a display unit 2040, and an audio/video (NV) input unit 2050.

The communication unit 2010 may include one or more components for performing communication between the image display device 100 and an external device (e.g., a server, etc.). For example, the communication unit 2010 may include a short-range wireless communication unit, a mobile communication unit, and a broadcast receiving unit.

For example, the communication unit 2010 may communicate with the image display device 100 according to an embodiment by using a short-range communication.

The sensing unit 2030 may include a sensor for sensing user's biometric information and a sensor for sensing a state of the control device 2000 or an ambient state of the control device 2000. In addition, the sensing unit 2030 may transmit information sensed by the sensor to the control unit 2020.

The NV input unit 2050 may be a component for inputting an audio signal or a video signal, and may include a camera 2051, a microphone 2053, and the like. The camera 2051 may obtain an image frame such as a still image, a moving image, or the like via an image sensor. The camera 2051 may include an infrared camera, a charge-coupled device (CCD) camera, or the like. An image captured via the image sensor may be processed via the control unit 2020 or a separate image processor (not shown). An image frame processed by the camera 2051 may be stored in the storage 2060 or may be transmitted to an external device. The camera 2051 may include two or more cameras according to a structural aspect of the control device 2000. For example, the camera 2051 may obtain a user's iris information by capturing a facial image of the control device user, obtaining the user's face information, or capturing the user's eye image. The obtained user's face information may be used for user authentication via face recognition, and the user's iris information may be used for user authentication via iris recognition.

The microphone 2053 may receive an external audio signal and processes the received signal into electric voice data. For example, the microphone 2053 may receive an audio signal from an external device or a speaker. The microphone 2053 may use various noise cancellation algorithms for canceling noise generated during reception of the external audio signal. For example, the microphone 2053 may obtain voice information of the control device user, and the obtained user's voice information may be used for user authentication via voice recognition.

The storage 2060 may store a program for processing and control by the control unit 2020, and may store input/output data (e.g., an application, content, an address book, etc.).

The storage 2060 may include a storage medium of at least one type of a flash memory type, a hard disk type, a multimedia card micro type, a card type memory (e.g., a secure digital (SD) or extreme digital (XD) memory, etc.), RAM, a static random access memory (SRAM), ROM, an electrically erasable programmable read-only memory (EEPROM), a programmable read-only memory (PROM), a magnetic memory, a magnetic disk, or an optical disk. In addition, the control device 2000 may operate a web storage or a cloud server that performs a storage function of the storage 2060 on the Internet.

The display unit 2040 according to an embodiment may convert an image signal, a data signal, an OSD signal, a control signal, and the like, processed by the control unit 2020, to generate a driving signal. The display unit 2040 may be implemented with a PDP, an LCD, an OLED, a flexible display, and the like, and may also be implemented with a three-dimensional (3D) display. In addition, the display unit 2040 may include a touch screen and thus may be used as an input device as well as an output device. For example, the display unit 2040 may display a remote control application execution screen.

The block diagram of the control device 2000 shown in FIG. 11 is a block diagram for an embodiment. Each of the components in the block diagram may be integrated, added, or omitted according to the specification of the control device 2000 that is actually implemented. That is, when necessary, two or more components may be integrated into one component or one component may be divided into two or more components. In addition, a function performed in each block is intended to describe embodiments of the disclosure, and a detailed operation or device thereof does not limit the scope of the disclosure.

The method of operating the image display device according to an embodiment may be implemented in the form of program commands that can be executed via various computer components and recorded in a computer-readable recording medium. The computer-readable recording medium may include a program command, a data file, a data structure and the like solely or in a combined manner. The program command recorded on the computer-readable recording medium may be a program command specially designed and configured for the disclosure or a program command known to be used by those of skill in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as ROM, RAM, flash memory, and the like. Examples of the program command include not only a machine language code created by a compiler but also include a high-level language code executable by a computer using an interpreter.

In addition, the method of operating the image display device according to the disclosed embodiments may be included in a computer program product and provided. The computer program product may be traded as a product between a seller and a buyer.

The computer program product may include a software (S/W) program and a non-transitory computer-readable recording medium in which the S/W program is stored. For example, the computer program product may include an S/W program product (e.g., a downloadable application) electronically distributed via a manufacturing company of an image display device or an electronic market (e.g., Google Play Store or App Store). For the electronic distribution, at least a portion of the SAN program may be stored in a storage medium or temporarily generated. In this case, the storage medium may be a storage medium of a server in the manufacturer or the electronic market or a relay server.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include an S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or artificial intelligence server, etc.) may execute a computer program product stored in the server to control the client device communicating with the server to perform the method according to the embodiments of the disclosure.

While the disclosure has been shown and described with reference to certain example embodiments thereof, the scope of the disclosure is not limited to the description and also includes various modifications and improvements made by those of ordinary skill in the art using the concept of the disclosure defined in the appended claims.

The invention claimed is:

1. An image display device comprising:
   a communication unit, comprising communication circuitry, configured to receive, from a control device, a control command for controlling an operation of the image display device;
   a memory storing one or more instructions; and
   a processor configured to execute the one or more instructions stored in the memory,
   wherein the processor is configured to execute the one or more instructions to:
   receive first user information about a first user corresponding to a user of the control device and authentication state information representing user authentication state in the control device;
   based on that the control command comprises an operation request that requires authentication, determine whether the first user information matches a second user information about a second user corresponding to a user of the image display device,
   based on that the first user information matches the second user information, perform the authentication based on the authentication state information; and
   based on that the authentication state information comprises information representing a state in which the authentication is completed in the control device by using biometric information of the first user, perform the operation in response to the control command.

2. The image display device of claim 1, wherein the control command comprises the first user information and the authentication state information.

3. The image display device of claim 1, wherein the first user information comprises account information of the first user, and the second user information comprises account information of the second user.

4. The image display device of claim 1, wherein the processor is further configured to, based on that the authentication state information comprises information representing a state in which a lock screen is unlocked in the control device by using the biometric information of the first user, control the display to display a screen for requesting authentication information.

5. The image display device of claim 1, wherein the processor is further configured to, based on that the first user information does not match the second user information, perform account login by using the first user information.

6. The image display device of claim 1, wherein the image display device further comprises a display, and
   the processor is further configured to, based on that the first user information does not match the second user information, control the display to display a screen for requesting authentication information.

7. The image display device of claim 1, wherein the image display device further comprises a display, and
   the processor is further configured to, when the authentication state information is not in a preset state, control the display to display a screen for requesting authentication information.

8. The image display device of claim 1, wherein the processor is further configured to:
transmit the first user information to an external server; receive a result of performing the authentication on the first user; and, based on the result, perform the operation in response to the control command.

9. A method of operating an image display device, the method comprising:
receiving first user information about a first user corresponding to a user of a control device and authentication state information representing a user authentication state in the control device;
receiving, from the control device, a control command for controlling an operation of the image display device;
based on that the control command comprises an operation request that requires authentication, determining whether the first user information matches a second user information about a second user corresponding to a user of the image display device;
based on that the first user information matches the second user information, performing the authentication based on the authentication state information; and
based on that the authentication state information comprises information representing a state in which the authentication is completed in the control device by using biometric information of the first user, performing the operation in response to the control command.

10. The method of claim 9, wherein the control command comprises the first user information and the authentication state information.

11. The method of claim 9, wherein the first user information comprises account information of the first user, and the second user information comprises account information of the second user.

12. The method of claim 9, further comprising, based on that the authentication state information comprises information representing a state in which a lock screen is unlocked in the control device by using the biometric information of the first user, displaying a screen for requesting authentication information.

* * * * *